United States Patent
Park (10) Patent No.: US 9,462,062 B2
(45) Date of Patent: Oct. 4, 2016

(54) PORTABLE TERMINAL FOR DISPLAYING LOCAL SERVICE BASED ON CONTEXT AWARENESS TECHNOLOGY, AND OPERATION METHOD OF THE PORTABLE TERMINAL

(75) Inventor: Sang Do Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 761 days.

(21) Appl. No.: 13/157,004

(22) Filed: Jun. 9, 2011

(65) Prior Publication Data

US 2012/0115514 A1   May 10, 2012

(30) Foreign Application Priority Data

Nov. 9, 2010   (KR) .................. 10-2010-0110931

(51) Int. Cl.
*H04W 24/00*   (2009.01)
*H04L 29/08*   (2006.01)
*H04W 4/04*   (2009.01)
*H04M 1/725*   (2006.01)
*H04L 12/28*   (2006.01)
*H04W 84/10*   (2009.01)

(52) U.S. Cl.
CPC ............ *H04L 67/16* (2013.01); *H04L 67/306* (2013.01); *H04M 1/72566* (2013.01); *H04W 4/04* (2013.01); *H04L 12/2803* (2013.01); *H04L 67/24* (2013.01); *H04W 84/10* (2013.01)

(58) Field of Classification Search
CPC ... H04L 67/16; H04L 12/2803; H04L 67/24; H04L 67/306; H04W 4/008; H04W 4/04; H04W 84/10; H04M 1/72566

USPC .......................................... 455/456.1–456.7
See application file for complete search history.

(56) References Cited

U.S. PATENT DOCUMENTS

| | | | | |
|---|---|---|---|---|
| 8,064,934 | B2 * | 11/2011 | Klassen ...................... | 455/466 |
| 2004/0266455 | A1 * | 12/2004 | Lee et al. .................. | 455/456.1 |
| 2009/0154426 | A1 * | 6/2009 | Perraud et al. .............. | 370/332 |
| 2009/0233574 | A1 * | 9/2009 | Shinozaki .................. | 455/404.2 |
| 2010/0067449 | A1 * | 3/2010 | Chen .......................... | 370/329 |
| 2011/0145252 | A1 * | 6/2011 | Sundaresan et al. ......... | 707/740 |
| 2012/0196626 | A1 * | 8/2012 | Fano et al. ................. | 455/456.3 |

FOREIGN PATENT DOCUMENTS

| | | |
|---|---|---|
| JP | 2004-282610 | 10/2004 |
| JP | 2008-276362 | 11/2008 |

(Continued)

OTHER PUBLICATIONS

An Approach to Providing a Seamless End-User Experience for Location—Aware Application by Duri et al ,pp. 20-25, 2001.*

(Continued)

*Primary Examiner* — Ajit Patel
(74) *Attorney, Agent, or Firm* — NSIP Law (57) ABSTRACT

Provided are a portable terminal for displaying a local service based on context awareness technology, and an operation method of the portable terminal. The portable terminal may discover a plurality of local services available at a current position, verify a current context of a user, apply a predetermined weight to one or more local services corresponding to the verified current context among the plurality of local services, and thereby display the one or more local services based on the weight.

20 Claims, 7 Drawing Sheets

(56) References Cited

FOREIGN PATENT DOCUMENTS

| KR | 10-2001-0016411 | | 3/2001 |
| KR | 10-2009-0001603 | A | 1/2009 |
| KR | 10-2009-0033989 | | 4/2009 |
| KR | 10-2009-0077258 | A | 7/2009 |
| KR | 10-2010-0062073 | | 6/2010 |

OTHER PUBLICATIONS

Korean Office Action issued on Jan. 14, 2016 in counterpart Korean Application No. 10-2010-0110931 (9 pages in Korean with English translation).

* cited by examiner

PORTABLE TERMINAL FOR DISPLAYING LOCAL SERVICE BASED ON CONTEXT AWARENESS TECHNOLOGY, AND OPERATION METHOD OF THE PORTABLE TERMINAL

CROSS-REFERENCE TO RELATED APPLICATION(S)

This application claims the benefit under 35 U.S.C. §119(a) of Korean Patent Application No. 10-2010-0110931, filed on Nov. 9, 2010, in the Korean Intellectual Property Office, the entire disclosure of which is incorporated herein by reference for all purposes.

BACKGROUND

1. Field

The following description relates to a portable terminal for displaying a local service suitable for a user based on context awareness technology, and an operation method of the portable terminal.

2. Description of Related Art

A local network that is accessible only as a local wireless network, such as, for example, a hot spot, a femtocell, and the like, may be referred to as a localized network. A network service within the localized network may be referred to as a local service.

Due to the many developments in mobile communication and near-field wireless communication technology, a portable terminal may be connected to the Internet without constraints on a time and an occasion, and may be connected to a neighboring local wireless network to utilize a local service.

In general, in a situation in which a user desires to utilize a neighboring local service using the portable terminal, the user may need or like to be aware of the variety of local services available around the portable terminal. In addition, the user may need or like to know which local service is connected to which local wireless network, and how to be connected to a local service within a corresponding local wireless network.

A process of obtaining, by the portable terminal, corresponding information to utilize a predetermined neighboring local service is referred to as a local service discovery.

As a result of the local service discovery, the user may obtain a list of the local services connectable and available at a predetermined point. The list of local services may be displayed on the portable terminal in the form of a text list, or may be shown to the user by displaying a corresponding service area on a map. However, according to generalization of local services, a plurality of local services may be discovered in a relatively narrow area, which may result in displaying a relatively large number of local service discovery results on a small screen of the portable terminal Such a display may obfuscate the choice of services available to the user, or otherwise cause the individual services to be difficult to discern due to the number of choices displayed on the relatively small screen.

As such, even though the development of wireless communication technology has enabled the user to utilize a variety of local services using the portable terminal, the user may spend a relatively large amount of time attempting to discover a local service suitable for the user according to an increase in a number of local services around the portable terminal.

In particular, when utilizing a mobile computing environment that is not a general personal computing environment, the user may experience an inconvenient user interface due to a small display screen. For example, a user of a cellular phone may be inconvenienced due to the size of the cellular phone's display, as opposed to the user of a device such as a laptop computer, which has a much larger display.

SUMMARY

In one general aspect, there is provided a portable terminal including a local service discovery unit to discover a plurality of local services available at a current position, a current context verification unit to verify a current context of a user using a context awareness engine, a local service extraction unit to extract, from the plurality of local services, one or more local services corresponding to the verified current context, and a display unit to emphasize in a display the extracted one or more local services.

The plurality of local services may correspond to network services within a local wireless network.

The local wireless network may be a hot spot or a femtocell.

The current context verification unit may be configured to verify the current context of the user using the contention awareness engine based on schedule information, information regarding whether the user is in a busy state or in a free state, preference information, or any combination thereof.

The portable terminal may further include a near-field wireless communication unit to receive, from another portable terminal, companion information collected through a near-field wireless communication.

The current context verification unit may be configured to verify a relationship between the user and a companion based on the received companion information, and to verify the current context of the user based on the verified relationship.

The portable terminal may further include a weight setting unit to apply a predetermined weight to each of the extracted one or more local services.

The display unit may be configured to display the extracted one or more local services prior to remaining local services.

The portable terminal may further include a local service execution processing unit to execute a corresponding local service in response to a selection of the displayed one or more local services being received.

In another general aspect, there is provided an operation method of a portable terminal including discovering a plurality of local services available at a current position, verifying a current context of a user using a context awareness engine, extracting, from the plurality of local services, one or more local services corresponding to the verified current context, applying a predetermined weight to each of the extracted one or more local services, and emphasizing in a display the extracted one or more local services based on the weight.

The method may further include receiving, from another portable terminal, companion information collected through a near-field wireless communication, wherein the verifying may include verifying a relationship between the user and a companion based on the received companion information, and verifying the current context of the user based on the verified relationship.

The emphasizing in the display may include displaying the extracted one or more local services with the applied weight prior to remaining local services.

A non-transitory computer-readable medium may include a program for instructing a computer to perform the method.

In another general aspect, there is provided a method of displaying local services at a portable terminal, the method including determining one or more services relevant to a current context of a user from among the available local services, and emphasizing the one or more relevant services in a display.

The one or more relevant services may be displayed in a list prior to remaining ones of the available local services.

The one or more relevant services may be differentiated from remaining ones of the available local services by a different font, a larger font, a bold font, an italicized font, a dynamic font, a colored background, or any combination thereof.

The one or more relevant services may be emphasized in an initial display, and remaining ones of the available local services may be displayed in response to an action by the user.

The one or more relevant services may be displayed on a map.

The current context of the user may be determined through a context awareness engine.

The current context of the user may be determined by analyzing user context information along with companion context information corresponding to a companion in proximity of the user.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

On various occasions in which it is determined that a detailed description related to a known function or configuration may make the various described examples unnecessarily ambiguous, such a detailed description may be omitted. Also, terms used herein are defined to appropriately describe the various examples and thus may be changed depending on a user, the intent of an operator, or a custom. Accordingly, the terms must be defined based on the following overall description of the various examples in this specification.

Figure 1:
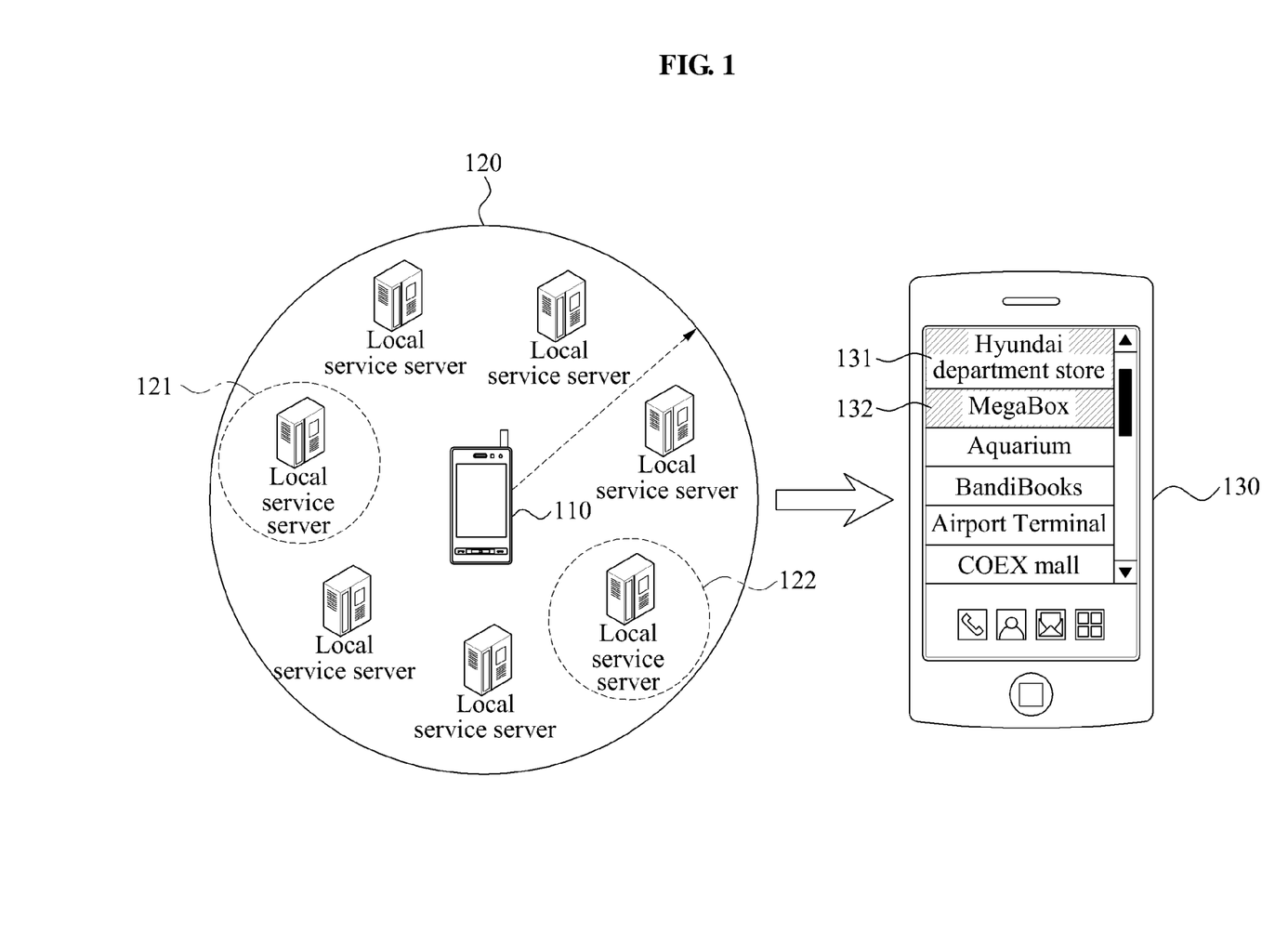
FIG. 1 is a diagram illustrating an example of local services displayed on a portable terminal.

FIG. 1 is a diagram illustrating an example of local services displayed on a portable terminal 130.

The portable terminal 130 may discover a plurality of local services available at a predetermined position 110. In other words, the portable terminal 130 may discover the local services available around a geographical area occupied by the portable terminal 130.

The portable terminal 130 may effectively display the discovered local services on a display, such as a screen.

The portable terminal 130 may emphasize in a display a local service suitable for a context of a user among the discovered local services. In other words, the portable terminal 130 may focus on certain local services that may be more relevant to the needs or desires of the user, among all of the plurality of local services available to the user, and emphasize on the display those more relevant local services. For this, it may be advantageous for the portable terminal 130 to obtain context information of the user. The context information of the user may include information regarding, for example, whether the user is in a busy state or in a free state, to-do information, companion information, spare time, and the like. In addition, it may be advantageous for the portable terminal 130 to obtain peripheral information associated with the user.

For example, the peripheral information may include a place, a time, a type of a discovered local service, and the like. An optimal local service may be extracted by generating a model through integration of the above information, and by inputting the model into a context awareness engine.

In general, the portable terminal 130 may discover local services available at a current position of the portable terminal 130 by performing a local service discovery.

The portable terminal 130 may receive, from a predetermined server, a list of local services available at the current position, or may discover local services by searching for signals associated with corresponding local services.

For example, the portable terminal 130 may transmit an inquiry to a centralized directory server to obtain peripheral service information, or may obtain local service information by directly searching a peripheral network. The obtained local service information may include a name, a class, a description, and the like, with respect to a corresponding local service.

Referring to FIG. 1, in an example in which the user searches for local services available at the position 110 using the portable terminal 130, the user may obtain a list of local service servers present within a valid coverage area 120, and may also obtain an approach scheme.

A user interface of the portable terminal 130 may display the available local services in a form of a list. In this instance, the portable terminal 130 may verify a current state of the user using a context awareness engine, and may display the list of local services based on the current context of the user.

For example, the portable terminal 130 may verify the current state of the user using personal information management (PIM) data and context awareness technology.

The PIM data may be stored in a memory of the portable terminal. The PIM data may include, for example, schedule information of the user, to-do information, preference information, friends information, information regarding whether the user is in a busy state or in a free state, and the like.

Accordingly, the portable terminal 130 may determine local services 121 and 122 among a plurality of local services to be more valuable, desirable, relevant, etc., based on the current context of the user, and may display the local services 121 and 122 to be differentiated from the remaining local services.

As one example, the portable terminal 130 may display the determined local services 121 and 122 at a higher priority position, such as at the top of the list, and then display the remaining local services below the determined local services 121 and 122.

As another example, the portable terminal 130 may display the determined local services 121 and 122 to be differentiated from the remaining local services by changing a character font of the determined local services 121 and 122. This differentiation may also be accomplished in any of a number of other ways, such as, for example, listing the local services 121 and 122 in a bold font, italics, and/or a dynamic fashion such as flashing text, utilizing a different background color that is different than the other listed local services, etc., or any combination of two or more of these qualities.

As still another example, the portable terminal 130 may display the local services 121 and 122 on a screen in a form of a map. The portable terminal 130 may emphasize in a display the determined local services 121 and 122 to be differentiated from the remaining local services.

In an example in which the portable terminal 130 displays the local services in a form of a list, the portable terminal 130 may display the determined location services 121 and 122 to be positioned at a top of the list.

For example, with respect to a local service discovery result in a form of a text list, the portable terminal 130 may enable the user to decrease a number of scrolling operations by positioning, in a top portion, items having a relatively high suitability with the user, as illustrated in shaded portions 131 and 132 of FIG. 1.

In an example in which the portable terminal 130 displays the local services on a map, the portable terminal 130 may emphasize the determined local services 121 and 122 by assigning an attribute such as a color, flickering, and the like, with respect to the determined local services 121 and 122.

According to various examples, instead of simply listing local service discovery results, it is possible to enhance the convenience of a user by providing a personalized service based on, for example, PIM data set for each user.

According to various examples, it is possible to prioritize a local service suitable for a context of a user by determining a local service to be emphasized based on a variety of variables, for example, a time flow, a change of a location, a companion, an age, a sex, and the like.

Figure 2:
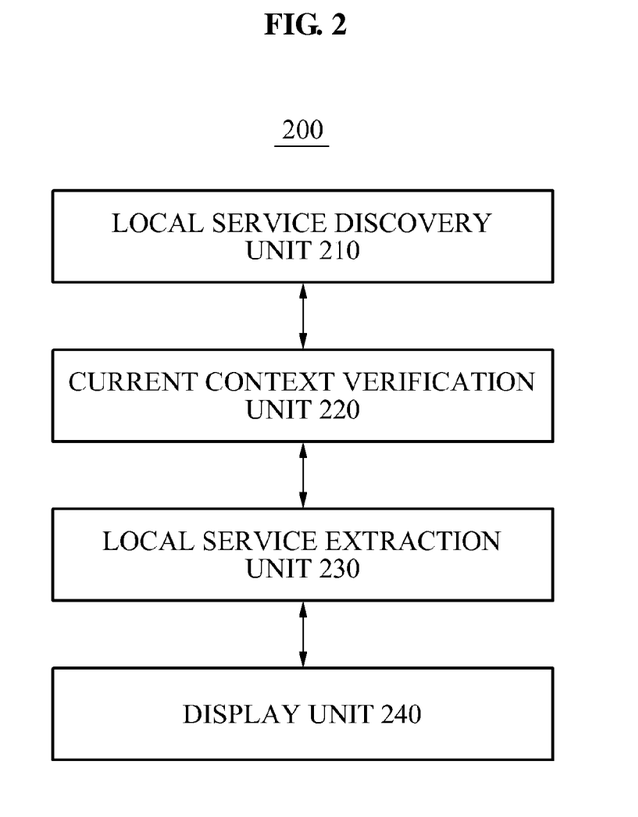
FIG. 2 is a diagram illustrating an example of a portable terminal.

FIG. 2 illustrates an example of a portable terminal 200.

Referring to FIG. 2, the portable terminal 200 may include a local service discovery unit 210, a current context verification unit 220, a local service extraction unit 230, and a display unit 240. While these units are illustrated as separate units to ease the description of same, it is understood that two or more of the units may be integrated into a single unit, hardware device, chip, or the like.

The local service discovery unit 210 may discover a plurality of local services available at a current position of the portable terminal 200.

The plurality of local services may be understood as network services within a local network accessible over a local wireless network, such as, for example, a hot spot, a femtocell, and the like.

The local service discovery unit 210 may receive, from a predetermined server, a list of local services available at the current position, or may search for corresponding local services by searching for detected signals.

The current context verification unit 220 may verify a current context of a user using, for example, a context awareness engine.

The current context verification unit 220 may verify the current context of the user based on PIM data using the context awareness engine. For example, the current context verification unit 220 may verify the current context of the user using the context awareness engine based on schedule information, information regarding whether the user is in a busy state or in a free state, preference information, and the like, or any combination thereof.

The local service extraction unit 230 may extract, from the plurality of local services, one or more local services corresponding to the verified current context. In more detail, the local service extraction unit 230 may determine which of the plurality of local services to emphasize according to the verified current context of the user.

A predetermined weight may be applied to each of the extracted one or more local services using a weight setting unit (not illustrated). In one example, a weight may be applied only to the extracted local services. In another example, a weight may be applied to all of the available local services, and the highest weights may be assigned to the extracted local services.

The display unit 240 may display the one or more extracted local services based on the weight. For example, the display unit 240 may emphasize in a display the one or more local services extracted from the plurality of local services such that the extracted one or more local services are easily differentiated from the remaining local services. That is, the display unit 240 may display the one or more local services as having a higher priority so as to be differentiated from remaining local services. In an example, the higher weighted extracted local services may be displayed in descending order, followed by the remaining local services. In another example, only the extracted local services may be displayed in weighted order on the screen initially, while the non-extracted local services may be subsequently displayed by, for example, a user performing a scrolling operation to see one or more subsequent displays on the screen.

Depending on various examples, the portable terminal 200 may further include a local service execution processing unit to execute a corresponding local service in response to a selection being received regarding the displayed one or more local services.

Figure 3:
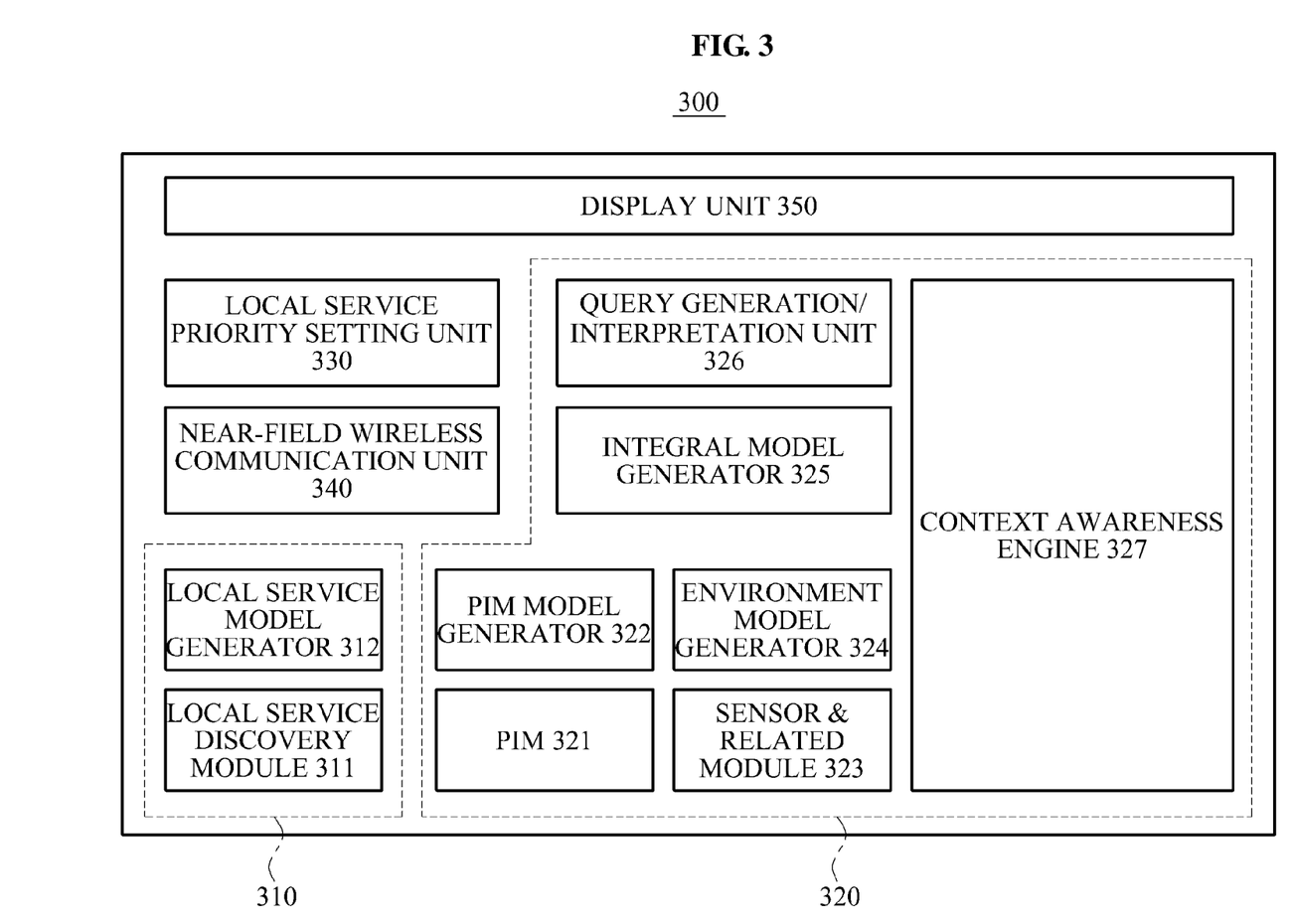
FIG. 3 is a diagram illustrating another example of a portable terminal.

FIG. 3 illustrates another example of a portable terminal 300.

Referring to FIG. 3, a local service discovery unit 310 of the portable terminal 300 may include a local service discovery module 311 and a local service model generator 312. The local service discovery module 311 may discover local services available at a current position of the portable terminal 300. The local service model generator 312 may generate a discovery result as a model. Regarding all of the described components of FIG. 3, while these units are illustrated as separate units to ease the description of same, it is understood that two or more of the units may be integrated into a single unit, hardware device, chip, or the like.

A current context verification unit 320 of the portable terminal 300 may include a PIM 321, a PIM model generator 322, a sensor and related module 323, and an environment model generator 324.

The current context verification unit 320 may further include an integral model generator 325, a query generation/interpretation unit 326, and a context awareness engine 327.

PIM data including schedules, personal information, and the like corresponding to the user may be stored in the PIM 321. The PIM model generator 322 may generate the PIM data as a model.

The sensor and related module 323 may collect various types of sensing information, for example, external environmental factors such as a current movement direction, a temperature, and the like. The environment model generator 324 may generate the collected external environmental factors as a model.

In one example, the model may indicate an ontology model, and may be understood as information used for operation at the context awareness engine 327.

The integral model generator 325 may generate an integral model by collecting models generated at the local service model generator 312, the PIM model generator 322, and the environment model generator 324.

The query generation/interpretation unit 326 may input the generated integral model as a query into the context awareness engine 327, make an inquiry about an importance of each local service, and collect responses thereto.

That is, the query generation/interpretation unit 326 may verify the importance of each local service as applied to the user.

A local service priority setting unit 330 may include a local service extraction unit (not illustrated), and may assign a weight, for example, a priority to each of the discovered local services, based on a corresponding importance.

For example, the local service priority setting unit 330 may extract, from the discovered local services, one or more local services interpreted by the query generation/interpretation unit 326, and may determine a priority based on an importance of each of the extracted one or more local services.

A display unit 350 may emphasize in a display the extracted one or more local services based on the priority.

The portable terminal 300 may further include a near-field wireless communication unit 340.

The near-field wireless communication unit 340 may receive, from another portable terminal, companion information that is collected through a near-field wireless communication.

The context awareness engine 327 may determine a correspondence of the received companion information by verifying the PIM 321, and may verify a relationship between a companion and the user.

The context awareness engine 327 may verify the current context of the user based on the verified relationship.

For example, in a case in which a current companion has a romantic relationship with the user and a current time corresponds to an evening time, the context awareness engine 327 may verify the current context of the user as a context in which the user may be attempting to find a dinner place or may be moving toward the dinner place.

Accordingly, the local service priority setting unit 330 may assign a highest priority to a local service associated with a dinner among extracted local services.

In this example, the companion information may include telephone number information of a portable terminal having transmitted the corresponding companion information. In the PIM data, a telephone number included in the companion information may be stored in a category such as 'boyfriend', 'girlfriend', or the like.

Figure 4:
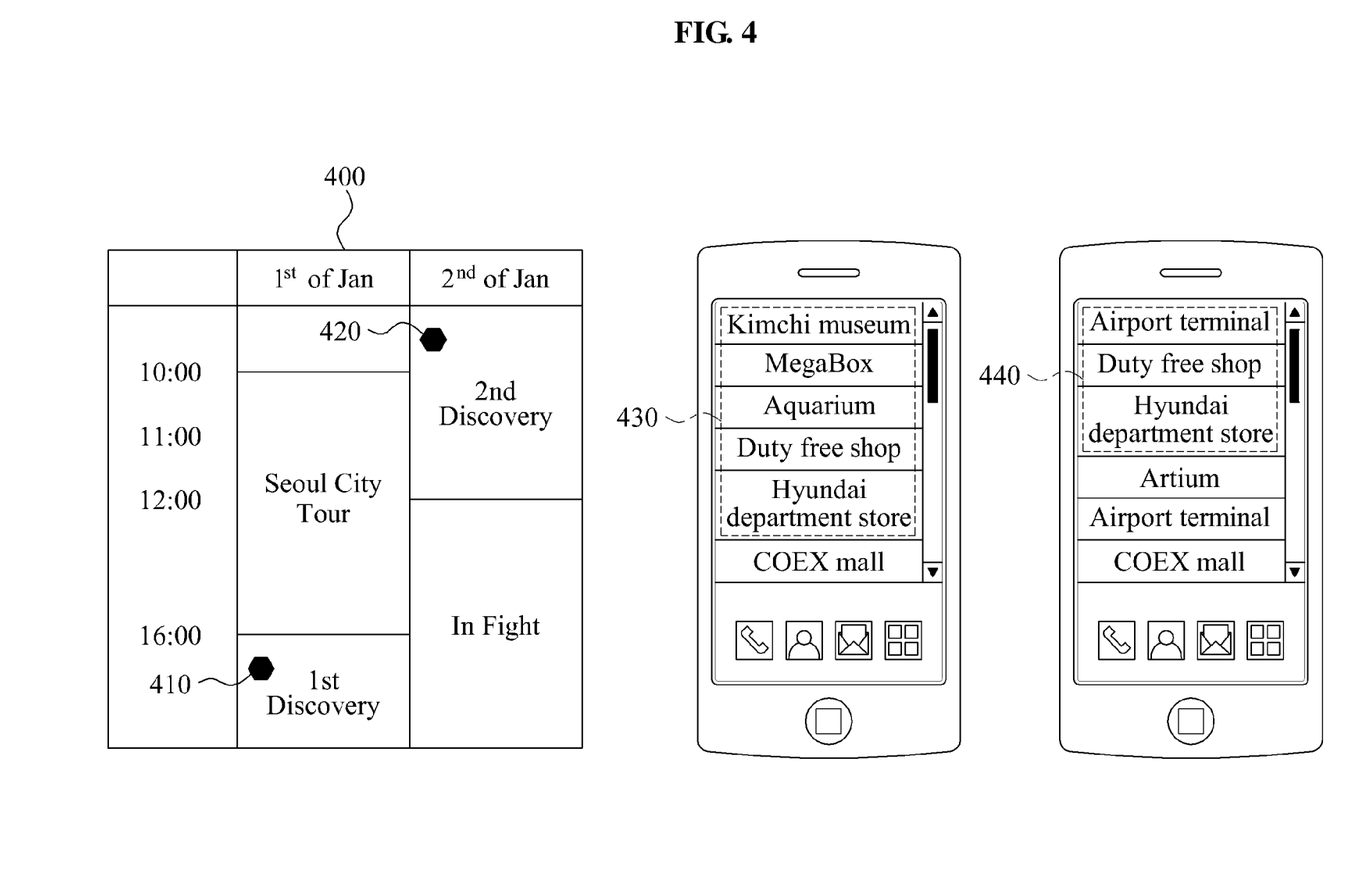
FIG. 4 is a diagram illustrating an example of local services displayed on a portable terminal based on schedule information of a user.

FIG. 4 illustrates an example of local services displayed on a portable terminal based on schedule information of a user.

In an example in which a record 'traveling with family for one night and two days from the $1^{st}$ of January' is included in the PIM data of the user, the portable terminal may discover a local service at a point in time indicated by a discovery marker 410 in a schedule table 400.

A result of the local service discovery performed after 16:00 on $1^{st}$ of January may be displayed on a screen of the portable terminal.

Since there is no further schedule of the day, the user may confirm that the user has spare time of at least five hours.

In addition, since the user is travelling with family, the portable terminal may assign a weight to local services such as, for example, a Kimchi museum, MegaBox, an aquarium, and the like, that the user may enjoy with family, among the discovered local services, and thereby display the local services with the weight as illustrated in a box 430.

In an example in which 'buying a gift for relatives' is included in a to-do list, the portable terminal may assign a relatively high priority to local services for shopping, such as, for example, a duty free shop, Hyundai department store, and the like, and thereby display the local services as illustrated in a box 440.

Referring to a marker 420, in an example in which the user performs a local service discovery at 9 a.m. on the $2^{nd}$ of January after one day is passed, the portable terminal may assign a highest weight to a local service associated with an airport terminal since 'in flight', which would logically be associated with an airport, is included in schedule.

In preparation for a case in which the user may not have bought a gift, the portable terminal may assign a predetermined weight to local services for shopping, such as, for example, a duty free shop, a Hyundai department store, and the like.

The portable terminal may determine that the user's spare time is insufficient and may apply a relatively low weight to such services as a Kimchi museum, MegaBox, an aquarium, and the like, to which a relatively high weight had previously been applied as the result of the local service discovery on $1^{st}$ of January.

Figure 5:
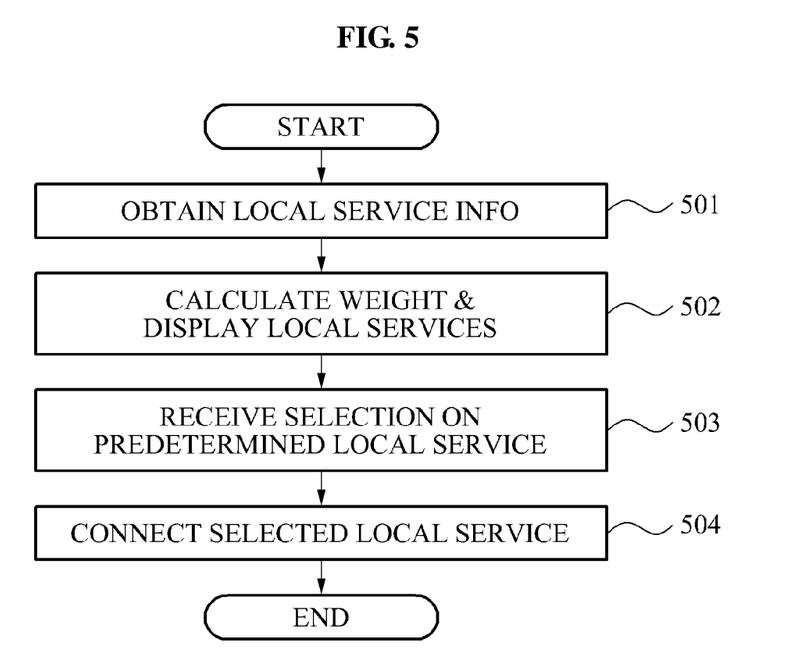
FIG. 5 is a flowchart illustrating an example of an operation method of a portable terminal.

FIG. 5 illustrates an example of an operation method of a portable terminal. In operation 501, a plurality of local services available at a current position of the portable terminal may be discovered and obtained.

In operation 502, a weight with respect to each of the plurality of local services may be calculated, and local services having a relatively high weight may be emphasized and thereby be displayed.

For example, a current context of a user may be verified using a context awareness engine, and one or more local services corresponding to the verified current context may be extracted from the discovered local services.

According to various examples, a predetermined weight may be applied to each of the one or more local services extracted from the plurality of local services. The extracted one or more local services may be emphasized and thereby be displayed based on the applied weight. In other various examples, a predetermined weight may be applied to all of the available local services, with the higher weights applied to the extracted one or more local services.

According to various examples, companion information that is collected over a near-field wireless communication may be received from another potable terminal and be used for the weight assignments.

More specifically, a relationship between a user and a companion may be verified based on the received companion information. The weight may be determined by verifying a current context of the user based on the verified relationship.

In operation 503, a selection of a predetermined local service may be received from the user. In operation 504, the predetermined local service may be connected in response to the selection.

Figure 6:
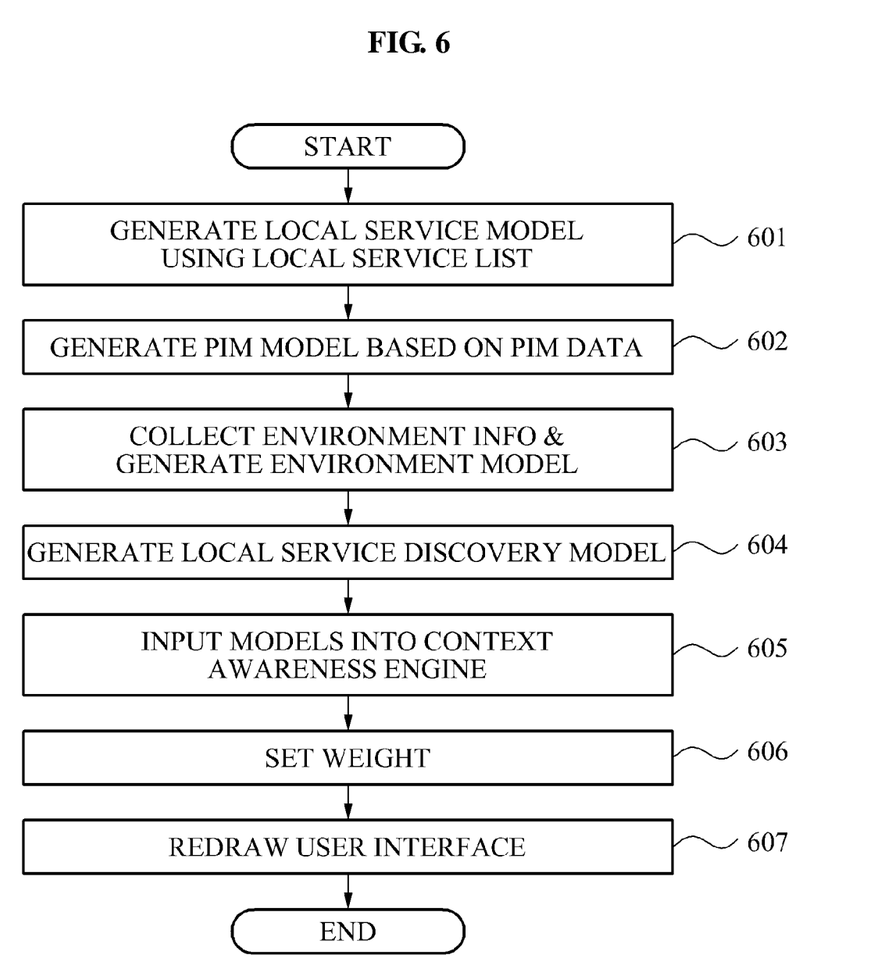
FIG. 6 is a flowchart illustrating an example of a method of assigning a weight to a local service at a portable terminal.

FIG. 6 illustrates an example of a method of assigning a weight to a local service at a portable terminal.

To assign a weight to each of a plurality of discovered local services, the portable terminal may generate a local service model using a local service list in operation 601, may generate a PIM model based on PIM data in operation 602, and may generate an environment model by collecting environment information in operation 603.

In operation 604, the portable terminal may generate a local service discovery model for a query using the generated models. In operation 605, the portable terminal may request a context awareness engine to verify a current context of a user by providing the local service discovery model to the context awareness engine.

In operation 606, the portable terminal may set a weight with respect to each of discovered local services based on an output from the context awareness engine. Alternatively, in operation 606, the portable terminal may instead only set a weight with respect to one or more local services which are more desirable to the user according to the output from the context awareness engine. In operation 607, the portable terminal may redraw a user interface, that is, newly display the discovered local services based on the set weight of the discovered local services.

Figure 7:
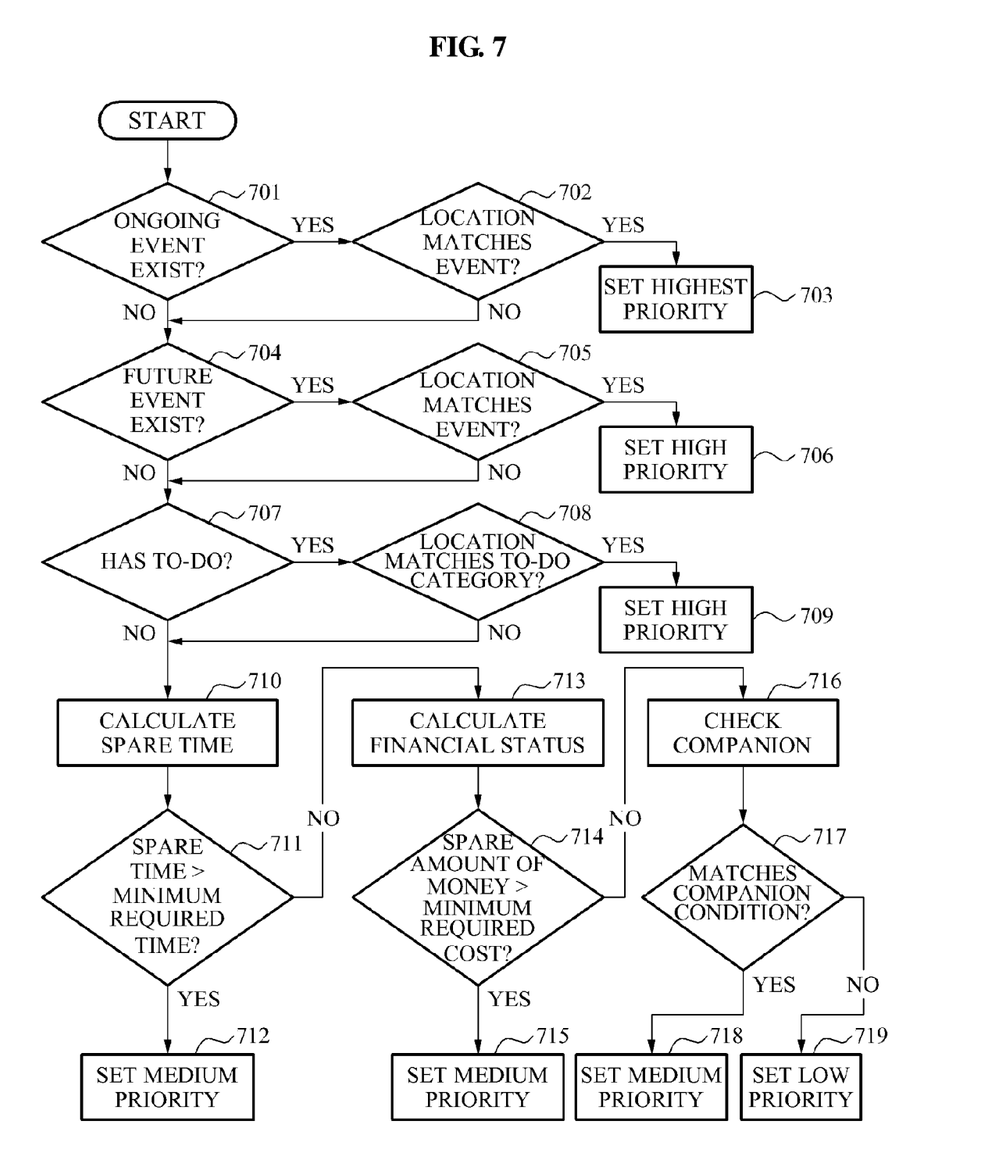
FIG. 7 is a flowchart illustrating an example of a method for integral modeling.

FIG. 7 illustrates an example of a method for integral modeling.

Discovery of a local service using a portable terminal indicates that a user has moved to a predetermined region with a predetermined intent. In an example in which the user's schedule corresponds to a local service, the corresponding local service may be regarded as an important service.

With the above assumption, whether a currently ongoing event exists among events registered to PIM data may be verified in operation 701.

In a case in which the ongoing event exists, whether the ongoing vent matches discovered local services may be determined in operation 702. In response to a matching local service existing, the matching local service may be set to have a highest priority in operation 703.

In response to the ongoing event not existing in operation 701, whether a future event exists may be determined in operation 704. In this example, the future event may correspond to an event to be proceeded.

In an example in which the future event exists, whether the future event matches the discovered local services may be determined in operation 705. In response to a matching local service existing, the matching local service may be set to have a relatively high priority in operation 706.

Whether an event registered to a PIM corresponds to a current event or a future event may be inferred based on a current time and event information using a context awareness engine, instead of being set by the user.

In an example in which both the current event and the future event correspond to predetermined local services, a local service associated with a current schedule may be set to have a relatively high importance.

In response to the future event not existing in operation 704, whether the user has a to-do item may be determined in operation 707.

In response to the user having the to-do item, whether a to-do item category matches the discovered local services may be determined in operation 708.

In response to a matching local service existing, the matching local service may be set to have a relatively high priority in operation 709.

In an example in which the user has the to-do item, whether the to-do item category matches a local service category may be verified rather than verifying of whether the to-do item exactly matches a corresponding local service.

In an example in which the schedule and to-do item information does not match, it may be assumed that the user is moving without a predetermined intent. Accordingly, an amount of available time may be verified by calculating a spare time remaining until a next schedule.

In response to the user not having the to-do item in operation 704, the spare time may be calculated by verifying PIM data in operation 710.

In operation 711, whether the calculated spare time is more than a minimum required time may be determined.

According to various examples, in a case in which a user's spare time is more than a minimum required time of a corresponding local service, the corresponding local service may be determined as a potentially useful service.

Accordingly, in an example in which the calculated spare time is more than the minimum required time, the discovered local services may be set to have a medium priority in operation 712.

In operation 713, an available financial status of the user may be verified based on the PIM data. In operation 714, whether a user's spare amount of money is more than a minimum required cost may be determined.

In an example in which the user's spare amount of money is more than the minimum required cost, the discovered local services may be set to have a medium priority in operation 715.

Conversely, in an example in which the spare amount of money is less than the minimum required cost, the companion may be checked in operation 716.

In response to the companion being registered as an acquaintance to PIM data, a condition of the companion may be determined in operation 717. In operation 718, the discovered local services may be set to have a medium priority by determining that the companion is located near the user and is moving together with the user.

Conversely, in an example in which the companion is not registered as the acquaintance to the PIM data, the local services may be set to have a relatively low priority in operation 719.

As a non-exhaustive illustration only, the terminals described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and the like capable of wireless communication or network communication consistent with that disclosed herein.

The processes, functions, methods and/or software described above including an operation method of a portable terminal may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage to medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A portable terminal, comprising:
   a local service discovery unit configured to discover a plurality of local services available at a current position;
   a current context verification unit configured to verify a current context of a user using a context awareness engine and configured to obtain peripheral information of the user;
   a local service extraction unit configured to extract, from the discovered plurality of local services, one or more local services corresponding to the verified current context and the peripheral information and configured to prioritize the plurality of local services based on at least two of variables comprising a time flow, a change of location, a companion, an event, an age, and a gender; and
   a display unit configured to emphasize, on a display, the extracted one or more local services from the discovered plurality of local services based on the prioritization of the plurality of local services,
   wherein the plurality of local services correspond to services available around a geographical area occupied by the portable terminal.

2. The portable terminal of claim 1, wherein the plurality of local services corresponds to network services within a local wireless network.

3. The portable terminal of claim 2, wherein the local wireless network is a hot spot or a femtocell.

4. The portable terminal of claim 1, wherein the current context verification unit is configured to verify the current context of the user using the context awareness engine based on schedule information, information regarding whether the user is in a busy state or in a free state, preference information, or any combination thereof.

5. The portable terminal of claim 1, further comprising:
   a near-field wireless communication unit to receive, from another portable terminal, companion information collected through a near-field wireless communication.

6. The portable terminal of claim 5, wherein the current context verification unit is configured to verify a relationship between the user and a companion based on the received companion information, and to verify the current context of the user based on the verified relationship.

7. The portable terminal of claim 1, further comprising:
   a weight setting unit to apply a predetermined weight to each of the extracted one or more local services.

8. The portable terminal of claim 1, wherein the display unit is configured to display the extracted one or more local services prior to remaining local services.

9. The portable terminal of claim 1, further comprising:
   a local service execution processing unit to execute a corresponding local service in response to a selection of the displayed one or more local services being received.

10. An operation method of a portable terminal, comprising:
    discovering a plurality of local services available at a current position;
    verifying a current context of a user using a context awareness engine;
    obtaining peripheral information of the user;
    extracting, from the plurality of local services, one or more local services corresponding to the verified current context and the peripheral information;
    prioritizing the plurality of local services based on at least two of variables comprising a time flow, a change of location, a companion, an event, an age, and a gender;
    applying a predetermined weight to each of the extracted one or more local services;
    emphasizing, on a display, the extracted one or more local services from the discovered plurality of local services based on the weight, and
    wherein the plurality of local services correspond to services available around a geographical area occupied by the portable terminal.

11. The method of claim 10, further comprising:
    receiving, from another portable terminal, companion information collected through a near-field wireless communication,
    wherein the verifying comprises:
    verifying a relationship between the user and a companion based on the received companion information, and
    verifying the current context of the user based on the verified relationship.

12. The method of claim 10, wherein the emphasizing in the display comprises displaying the extracted one or more local services with the applied weight prior to remaining local services.

13. A non-transitory computer-readable medium comprising a program for instructing a computer to perform the method of claim 10.

14. A method of displaying local services at a portable terminal, the method comprising:

determining one or more services relevant to a current context and peripheral information of a user from among available local services;

prioritizing the plurality of local services based on at least two of a plurality of variables comprising a time flow, a change of location, a companion, an event, an age, and a gender; and emphasizing the one or more relevant services from the available local services that corresponds to the current context and the peripheral information on a display based on the prioritization of the plurality of local services, and wherein the plurality of local services correspond to services available around a geographical area occupied by the portable terminal.

15. The method of claim 14, wherein the one or more relevant services are displayed in a list prior to remaining ones of the available local services.

16. The method of claim 14, wherein the one or more relevant services are differentiated from remaining ones of the available local services by a different font, a larger font, a bold font, an italicized font, a dynamic font, a colored background, or any combination thereof.

17. The method of claim 14, wherein the one or more relevant services are emphasized in an initial display, and remaining ones of the available local services are displayed in response to an action by the user.

18. The method of claim 14, wherein the one or more relevant services are displayed on a map.

19. The method of claim 14, wherein the current context of the user is determined through a context awareness engine.

20. The method of claim 14, wherein the current context of the user is determined by analyzing user context information along with companion context information corresponding to a companion in proximity of the user.

\* \* \* \* \*